(12) United States Patent
Gratta

(10) Patent No.: US 9,021,945 B2
(45) Date of Patent: May 5, 2015

(54) SHELL CRACKING AND RETAINING DEVICE

(71) Applicant: Vito R. Gratta, Hull, MA (US)

(72) Inventor: Vito R. Gratta, Hull, MA (US)

(*) Notice: Subject to any disclaimer, the term of this patent is extended or adjusted under 35 U.S.C. 154(b) by 303 days.

(21) Appl. No.: 13/659,868

(22) Filed: Oct. 24, 2012

(65) Prior Publication Data

US 2013/0104753 A1 May 2, 2013

Related U.S. Application Data

(60) Provisional application No. 61/551,879, filed on Oct. 26, 2011.

(51) Int. Cl.
*A47J 43/26* (2006.01)
*A22C 29/02* (2006.01)

(52) U.S. Cl.
CPC ............... *A22C 29/027* (2013.01); *A47J 43/26* (2013.01)

(58) Field of Classification Search
CPC ..... A47J 43/26; A22C 29/024; A22C 29/027; A23N 5/00

USPC ......... 99/571, 574, 575, 577, 578, 581, 582; 452/6; 30/120.1, 120.2, 120.3, 120.4, 30/120.5
See application file for complete search history.

(56) References Cited

U.S. PATENT DOCUMENTS

| | | | | |
|---|---|---|---|---|
| 1,134,265 A | * | 4/1915 | Harper | 30/120.3 |
| 1,499,653 A | * | 7/1924 | Hagadorn | 30/120.4 |
| 1,598,490 A | * | 8/1926 | Miller | 30/120.3 |
| 2,335,806 A | * | 11/1943 | Sjostrom | 452/6 |
| 4,976,029 A | * | 12/1990 | Kennedy | 30/114 |
| 5,634,272 A | * | 6/1997 | Samuelson | 30/120.3 |
| 5,842,410 A | * | 12/1998 | Comeaux | 99/581 |
| 6,151,782 A | * | 11/2000 | Le Bail | 30/120.3 |
| 6,675,701 B2 | * | 1/2004 | Christiansen | 99/582 |
| 7,140,288 B2 | * | 11/2006 | Twerdok | 83/862 |
| 7,565,745 B2 | * | 7/2009 | Von Schoultz | 30/120.2 |
| 2006/0117967 A1 | * | 6/2006 | Roberts et al. | 99/568 |

* cited by examiner

*Primary Examiner* — Reginald L Alexander
(74) *Attorney, Agent, or Firm* — Brian J. Libby

(57) ABSTRACT

A shell cracking and retaining device for cracking shelled food products, wherein the device entirely or substantially retains food, shell portions and other debris during the cracking process, and therefore prevents said food, shell portions and other debris from being sent airborne from the device.

15 Claims, 5 Drawing Sheets

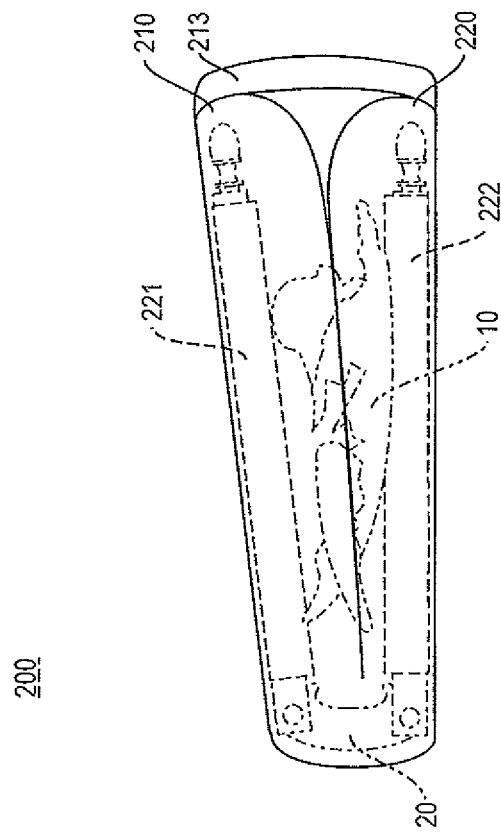
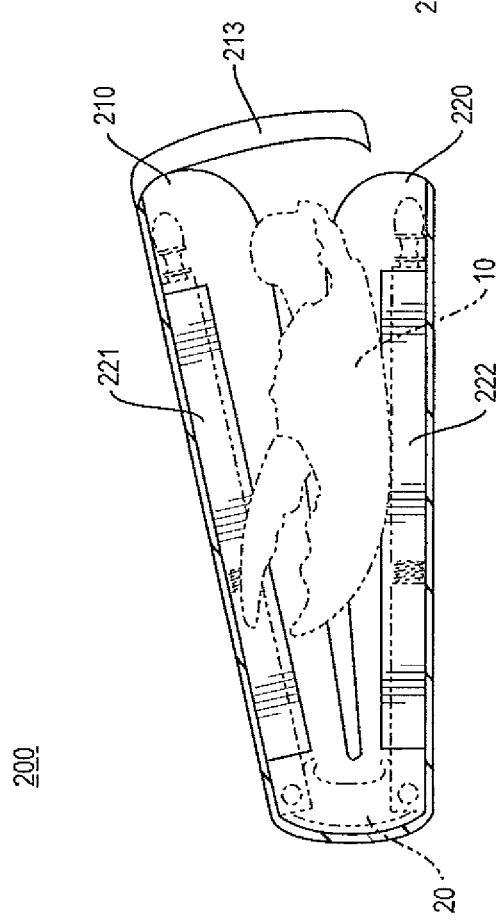

SHELL CRACKING AND RETAINING DEVICE

CROSS REFERENCE TO RELATED APPLICATION

This application claims the benefit under 35 U.S.C. §119 (e) of U.S. Provisional Patent Application Ser. No. 61/551,879, filed Oct. 26, 2011, the disclosure of which is incorporated herein by reference in its entirety.

BACKGROUND OF THE INVENTION

1. Field of the Invention

The present invention relates to devices for cracking the shells of shelled food products. More particularly, the present invention relates to shelled food product cracking devices that are capable of entirely or substantially retaining cracked shell portions and other associated debris from the food product therein.

2. Description of the Prior Art

Eating shelled food, and crustaceans such as lobster and crab, in particular, often makes for a messy experience. During the shell cracking process, flying portions of shell and other solid and liquid food contents can, and often do, project from the shell and onto the eater and nearby objects and, worse, other diners. This messy practice is hardly tolerable at an outdoor lobster fest, and it can completely ruin a more formal indoor dining experience.

Unfortunately, existing shell cracking tools are not optimally arranged to prevent shell and other food material from being sent airborne during the cracking process. These existing devices include devices specifically designed to crack shells, such as the large variety of bi-lever nutcrackers or other nutcrackers that are commercially available, for example, man-made tools that are not specifically meant for cracking shells, such as a clawhead hammer or pipe wrench, for example, and even more primitive tools, such as a large rock or block of wood, for example. In using these existing devices, the user either squeezes the levers of the nutcracker together while a shelled food product is positioned therebetween or simply smashes the shelled food product (when the devices not specifically meant for cracking shells or other primitive tools are selected) while it is on a hard surface, and in doing either one of these, there is nothing to prevent shell portions or other debris from being expelled away from the nutcracker or other cracking tool.

What is needed therefore is a shell cracking device that substantially retains cracked shell portions and other debris during the cracking process to prevent such materials from being sent airborne. The present invention is a shell cracking device that is optimally arranged to achieve this goal.

SUMMARY OF THE INVENTION

It is an object of the present invention to provide a shell cracking and retaining device that allows its user to crack a shelled food product, such as lobster, crab, or nuts, for example, without risk that cracked shell portions and other debris, such as lobster or clam meat or juice, for example, will be sent airborne and possibly onto the individual who is using the device, or onto those persons or objects nearby said individual. This object and other objects are achieved with the present invention, which is a shell cracking and retaining device.

In a first embodiment, a shell cracking and retaining device of the present invention includes a cover member and a base member, wherein the cover member is removably connectable to, or is fixedly attached to, the base member. In this first embodiment, the device also includes one or more cracking members, wherein the one or more cracking members are removably connectable to, or are fixedly attached to, the first member. The cracking members are useful for cracking a shelled food product. Further, the device of the first embodiment includes a basin. The basin, which is a portion of the second member, is capable of receiving an uncracked shelled food product prior to the cracking of the food product by the device, and then retaining said food product (and any debris thereof) both during and after the cracking process.

In the first embodiment, the first member is connected to the second member by one or more hinges or by any other equivalent item or means for allowing the first member to swing toward and away from the base member while maintaining connection of the cover member and the base member.

In the first embodiment, the device is formed from any one or more of a plurality of rigid materials. For example, the device may be formed from one or more plastics, one or more metals, and/or one or more metal alloys.

In a second embodiment, a shell cracking and retaining device of the present invention includes a first member and a second member, wherein the first member is removably connectable to, or is fixedly attached to, the second member. In this second embodiment, the device further includes at least one first bi-lever nutcracker device-retaining member and at least one second bi-lever device-retaining member, and, optionally, a bi-lever nutcracker associated therewith. The bi-lever nutcracker is either fixedly attached to, or is removably connectable to, the first member and the second member. In the second embodiment, the device also optionally may include a folded portion that either entirely or partially connects the first member to the second member. Further, the device includes an optional shielding member which aids in the retention of food materials within the device.

In the second embodiment, the device is formed from any one or more of a plurality of rigid materials. For example, the device may be formed from one or more paper-based products (that optionally may be waterproof or substantially waterproof), one or more plastics, one or more metals, and/or one or more metal alloys.

The details of one or more examples related to the invention are set forth in the accompanying drawings and the description below. Other features, objects, and advantages of the invention will be apparent from the description and the drawings.

BRIEF DESCRIPTION OF THE DRAWINGS

FIG. 5 is a second side view of the shell cracking and retaining device of FIGS. 3 and 4, wherein the device is shown in an open conformation and as having an untracked shelled food product (lobster claw) contained therein.

FIG. 6 is a third side view of the shell cracking and retaining device of FIGS. 3-5, wherein the device is shown in a closed conformation and the shelled food product (lobster claw) is shown as being cracked and contained therein.

REFERENCE NUMBERS USED IN DRAWINGS

Figure 1:
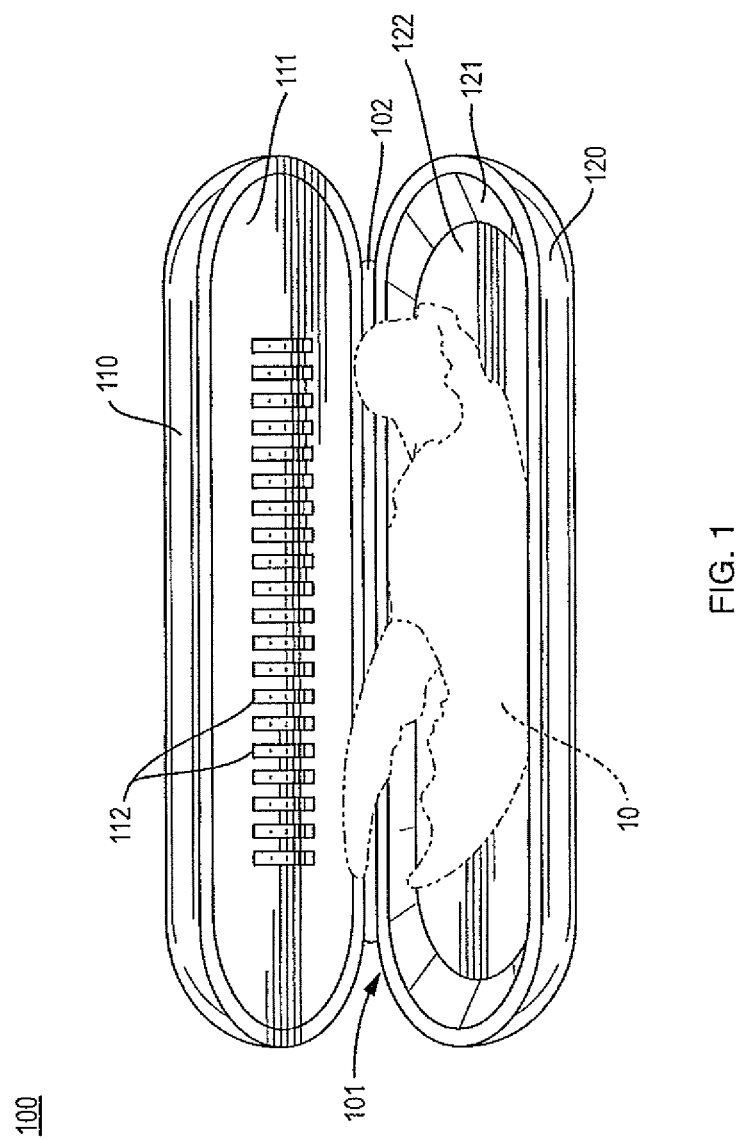
FIG. 1 is a first top perspective view of a shell cracking and retaining device of the present invention in a first embodiment, wherein the device is shown in an open conformation and as having an uncracked shelled food product (lobster claw) contained therein.

The present invention is described in more detail with reference to exemplary embodiments thereof as shown in the appended drawings. While the present invention is described below including preferred embodiments, it should be understood that the present invention is not limited thereto. Furthermore, it should be noted that the drawings are not intended to depict particular scales or proportions. However, like elements are given like reference numbers in the drawings. With regard to the reference numerals used, the following numbering is used throughout the various drawing drawings:

NUMBER DESCRIPTION

10 Shelled food product
20 Nutcracker
21 First lever of nutcracker 20
22 Second lever of nutcracker 20
100 First embodiment of a shell cracking and retaining device of the present invention
101 Side of the device 100
102 Hinged portion
110 Cover member
111 Bottom portion of the cover member 110
112 Cracking member
120 Base member
121 Top portion of the base member 120
122 Basin
200 Second embodiment of a shell cracking and retaining device of the present invention
210 First member
211 First channel
212 Inner surface of the first member 210
213 Shielding member
220 Second member
221 Second channel
222 Inner surface of the second member 220
230 Optional folded portion

DETAILED DESCRIPTION OF THE PREFERRED EMBODIMENTS

It is an object of the present invention to provide a food shell cracking and retaining device that is optimally arranged to prevent shell portions and other debris from being sent airborne during the cracking process, such as when it is used to crack lobster, crab, nuts or any other shelled food item.

Figure 2:
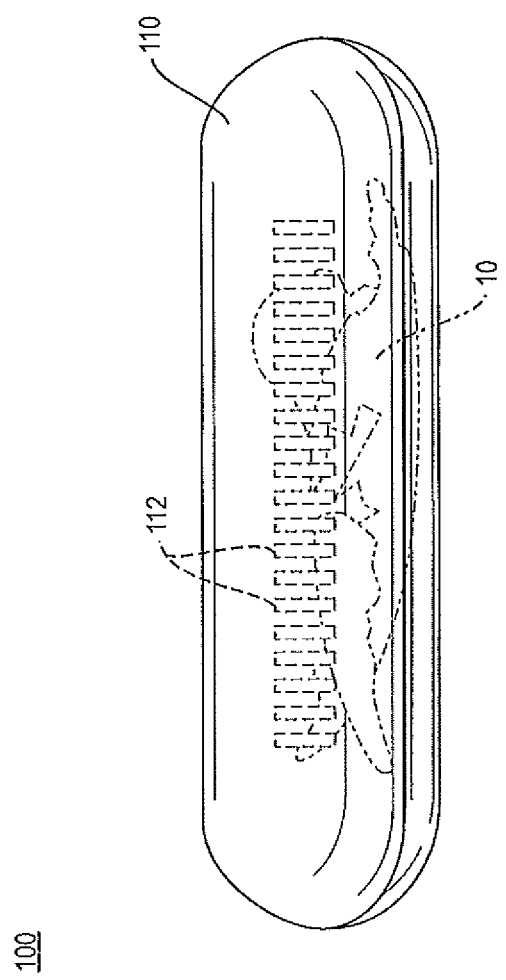
FIG. 2 is a second top perspective view of the shell cracking and retaining device of FIG. 1, wherein the device is shown in a closed conformation and the shelled food product (lobster claw) is shown as being cracked and contained therein.
Figure 4:
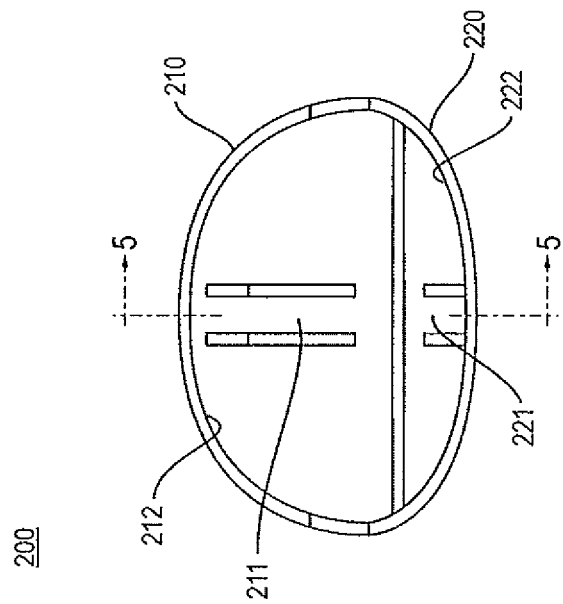
FIG. 4 is a cross-sectional view of the shell cracking and retaining device of FIG. 3.
Figure 3:
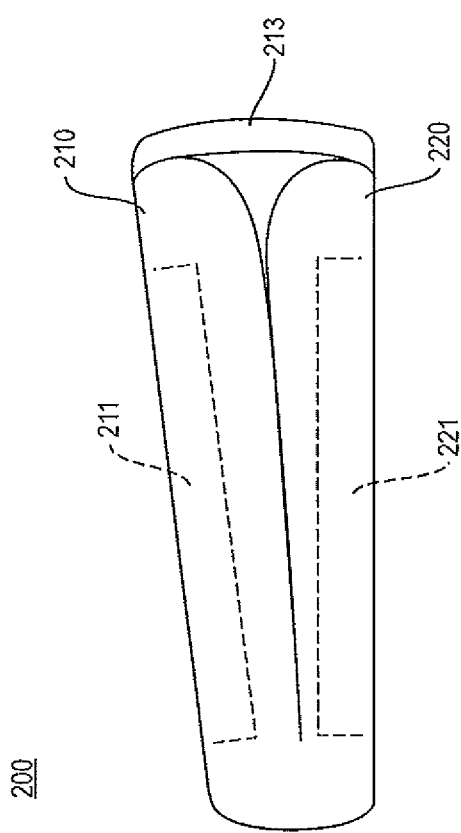
FIG. 3 is a first side view of a shell cracking and retaining device of the present invention in a second embodiment.

Referring to FIGS. 1 and 2, in a first embodiment of the present invention, a shell cracking device 100 includes a cover member 110 and a base member 120 that is connected to the cover member 110 at side 101 of the device 100 via a hinged portion 102. Bottom portion 111 of the cover member 110 includes a plurality of cracking members 112 that are spaced from one another and that protrude from, and are arranged in parallel along, the bottom portion 111. Top portion 121 of the base member 120 includes a basin 122.

The device 100 is useful for cracking a shelled food item and preventing said food item from being expelled airborne during the cracking process as shown in FIGS. 1 and 2 and explained as follows. A shelled food product 10 (which specifically is shown as a lobster claw in FIGS. 1 and 2) is placed into the basin 122 by a user of the device 100 while the cover member 110 is extended away from the base member 120. The user then forcefully moves the cover member 110 toward the base member 120 such that the cracking members 112 contact and crack the shell of the shelled food product 10. At this time, shell fragments and other food fragments and liquid food contents remain entirely within, or substantially within, the device 100. The user then can extend the cover member 110 away from the bottom member 120, retrieve the newly cracked shell food product 10 from the basin 122, separate any cracked shell portions from the edible contents of the food product 10, and consume the same edible contents.

One of ordinary skill in the art will recognize that several deviations may be made to the shell cracking and retaining device 100 and that each one of these deviations is within the scope of the present invention. For example, it is not necessary that the cover member 110 and the base member 120 be hingedly connected to each other via the lone hinged portion 102. The cover member 110 and the base member 120 therefore may be connectable to each other by a plurality of hinged portions or by a single or plurality of an equivalent item. Further, the cover member 110 and the base member 120 also may be integrally formed such that the point or plane of connection is flexible, such as when the device 100 is formed from plastic, for example. The skilled artisan will recognize that other arrangements are also possible for achieving a connection of the cover member 110 and the base member 120 that allows the cover member 110 to swing toward and away from the base member 120 while maintaining connection of the cover member 110 and the base member 120.

It is also to be understood that the cracking members 112 are not limited to relative size, spacing, shape, or number as those shown in the drawings herein. Further, it is to be understood that alternative cracking members, or even a single alternative cracking member, that has/have an equivalent function to that of the cracking members 112 may be substituted for the cracking members 112. Any one or more cracking member that is/are capable of cracking a shelled food item therefore may be substituted for the cracking members 112.

Further, it is to be understood that the present shell cracking device 100 may be formed from any one or more of a plurality of suitable materials. These materials include, but are not limited to, plastics, such as polypropylene, polyethylene, and polystyrene, or any mixture thereof, for example, and metals and metal alloys, such as aluminum and stainless steel, for example. Regardless of which one or more materials are used to form the device 100, the device 100 (including the cracking members 112 or any equivalent thereof) should be substantially rigid enough to withstand the cracking process and therefore allow for a plurality of cracking events to be carried out.

Referring to FIGS. 3-6, in a second embodiment of the present invention, a shell cracking and retaining device 200 includes a first member 210 and a second member 220. The first member 210 and the second member 220 are hingedly connected to each other at first end 201 of the device 200. Further, the first member 210 includes two bi-lever nutcracker device-retaining members, which are, specifically, a first channel 211 present at inner surface 212 of the first member 210, and a second channel 221 present at inner surface 222 of the second member 220. The shell cracking and retaining device 200 also includes a multi-positionable shielding member 213.

As shown in FIG. 5, the device 200 is capable of receiving by friction fit and removably retaining a hinged, bi-lever nutcracker. An exemplary hinged, bi-lever nutcracker is shown as nutcracker 20, but it is to be understood that the shell cracking and retaining device 200 may be arranged to receive and retain any one of a variety of other equivalent hinged, bi-lever nutcrackers. (Although the nutcracker 20 is shown as being removably connectable to the device 200, is contemplated that the device 200 may be arranged such that it includes a nutcracker, such as the nutcracker 20, for example, that is fixedly connected to the device 200.)

The device 200 may be used to crack a shelled food product and retain shell portions and other debris as follows. A shelled food product 10 (which specifically is shown as a lobster claw in FIG. 5) is placed entirely or substantially between first lever 21 and second lever 22 of the nutcracker 20, and therefore between the first member 210 and the second member 220. The user of the device 200 then forcefully moves the first member 110 and the second member 220 toward each other such that the nutcracker 20 cracks the shell of the shelled food product 10. At this time, shell fragments and other food fragments and liquid food contents remain entirely within, or substantially within, the device 200. The shielding member 213 assists in the entire or substantial retention of the food contents of the device 200 by shielding the open portion of the device 200. The user then releases one of the first member 210 and the second member 220 such that they extend away from each other when the first lever 21 is forced away from the second lever 22. This allows the user to then remove the newly cracked shell food product 10 from inside the device 200, separate any cracked shell portions from the edible contents of the food product 10, and consume the same edible contents.

One of ordinary skill in the art will recognize that several deviations may be made to the shell cracking and retaining device 200 and that each one of these deviations is within the scope of the present invention. For example, the device may include bi-lever nutcracker device-retaining members that are not the first and second channels 211/221. Alternatively, equivalent bi-lever nutcracker device-retaining members include one or more clips or rings, for example. The skilled artisan will recognize that there is a large variety of items that are capable of holding and retaining the nutcracker 20 (or an equivalent thereof) to the first and second members 210/220, and therefore are suitable for serving as alternatives to the first and second channels 211/221.

As another example, the shielding member 213 is optional. Further, when the shielding member is included, it may exist in a variety of forms, as will be apparent to the skilled artisan. For example, it may be in the form of a flap that is foldable in a manner that allows said flap to exist in two conformations as selected by the user: (1) a first conformation wherein the flap is held substantially parallel to the first member 210 and the second member 220; and (2) a second conformation wherein the flap is held substantially perpendicular to the first member 210 and the second member 220. Also, no matter which form it is in, the shielding member may be removably connected, or fixedly attached, to either one or both of the first member 210 and the second member 220.

Further, it is to be understood that the present shell cracking device 200 may be formed from any one or more of a plurality of suitable materials. These materials include, but are not limited to, paper-based products, such as, for example, corrugated cardboard made waterproof or water-resistant by associating a substrate (such as a plastic- or wax-based substrate, for example) therewith the cardboard. Other suitable materials include plastics, such as polypropylene, polyethylene, and polystyrene, or any mixture thereof, for example, and various metals and metal alloys, such as stainless steel and aluminum, for example. Regardless of which one or more materials are used to form the device 200, the device 200 should be substantially liquid-proof or liquid-resistant enough to withstand exposure to liquid material, such as lobster juice, for example, to allow a plurality of cracking events to be carried out. It is further contemplated that the device 200 may be arranged for disposable use (such as when it is formed from corrugated cardboard or other paper-based material) or it may be arranged for repeated, long-term use (such as when it is formed from plastic, metal, metal alloy or any other durable material or materials). When the device 200 is arranged for repeated, long-term use, it should be able to withstand a rigorous washing process, such as one carried out by a mechanical dishwasher, for example.

Figure 7:
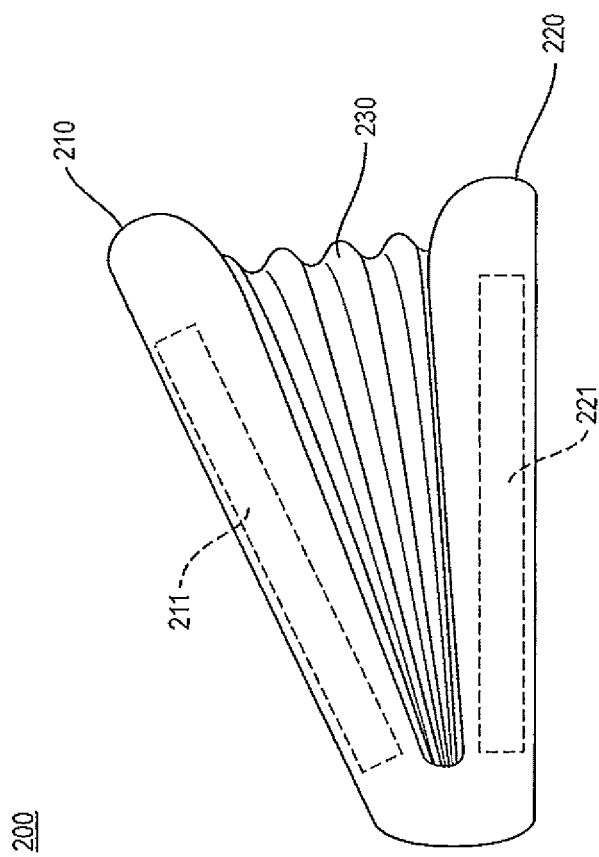
FIG. 7 is a fourth side view of the shell cracking and retaining device of FIG. 3, wherein in the device is shown as having an optional folded portion.

When the device 200 is formed from a flexible material, such as plastic or paper, for example, the device 200 may optionally include an accordion-like folded region similar to the folded portion 230 shown in FIG. 7. Said folded region 230 (or any equivalent thereof) would allow for movement of the first member 210 toward and away from the second member 220 while also allowing for optimal retention of shell portions and other food debris within the device 200 as it is being used to crack a shelled food product.

Further, it is to be understood that the present invention also encompasses the device 200 without any nutcracker associated therewith. In this sense, the present invention may be considered to be a shell cracking and retaining device that includes all portions of the device 200 but the nutcracker 20 (or any equivalent thereof), and said device is removably connectable to any nutcracker that exists separately, such as any one of the many already commercially available nutcrackers, for example.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as described by the following claims.

What is claimed is:

1. A shell cracking and retaining device, comprising: a. a first member having a first inner surface and a second member having a second inner surface, wherein the first member having the first inner surface is removably connectable to, or is fixedly attached to, the second member having the second inner surface; and b. at least one first hi-lever nutcracker retaining member at the first inner surface and at least one second bi-lever nutcracker retaining member at the second inner surface, wherein the at least one first bi-lever nutcracker retaining member and the at least one second bi-lever nutcracker retaining member are arranged to receive a bi-lever nutcracker substantially along the length of each one of the first inner surface and the second inner surface, and wherein the first member having the first inner surface and the second inner surface, and wherein the first member having the first inner surface and the second inner member having the second inner surface form a chamber arranged to substantially retain cracked materials when a first lever of the nutcracker is move toward a second lever of the nutcracker when the nutcracker is at the first inner surface and the second inner surface.

2. The device of claim 1 further comprising the bi-lever nutcracker that is removably connectable to, or wherein the bi-lever nutcracker is fixedly attached to, the first member having the first inner surface and the second member having the second inner surface.

3. The device of claim 1 wherein the first member is entirely or at least partially connected to the second member via a folded portion.

4. The device of claim 1 wherein the device is formed from a paper-based product.

5. The device of claim 4 wherein the paper-based product is waterproof or is substantially waterproof.

6. The device of claim 1 wherein the device is formed from one or more plastics.

7. The device of claim 1 wherein the device is formed from one or more metals, one or more metal alloys, or one or more metals and one or more metal alloys.

8. The device of claim 1 wherein each one of the at least one first bi-lever nutcracker retaining member and at least one second bi-lever nutcracker retaining member is a channel.

9. A shell cracking and retaining device, comprising: a. a first member having a first inner and a second member having a second inner surface, wherein the first member having the first inner surface is removably connectable to, or is fixedly attached to, the second member having the second inner surface; b. at least one first bi-lever nutcracker retaining member and at least one second bi-lever nutcracker retaining member; and c. a bi-lever nutcracker that is removably connectable to, or is fixedly attached to, the first member at and substantially along the first inner surface and the second member at and substantially along the second inner surface, wherein the first member having the first inner surface and the second member having the second inner surface form a chamber arranged to substantially retain cracked materials when a first lever of the nutcracker is moved toward a second lever of the nutcracker.

10. The device of claim 9 wherein the first member is entirely or at least partially connected to the second member via a folded portion.

11. The device of claim 9 wherein the device further includes a shielding member.

12. The device of claim 9 wherein the device is formed from a paper-based product.

13. The device of claim 9 wherein the device is formed from one or more plastics.

14. The device of claim 9 wherein the device is formed from one or more metals, one or more metal alloys, or one or more metals and one or more metal alloys.

15. The device of claim 9 wherein each one of the at least one first bi-lever nutcracker retaining member and at least one second bi-lever nutcracker retaining member is a channel.

\* \* \* \* \*